US011030254B2

(12) United States Patent
Shrigondekar et al.

(10) Patent No.: US 11,030,254 B2
(45) Date of Patent: *Jun. 8, 2021

(54) STORAGE ESTIMATION IN A DATA INDEXING AND QUERY SYSTEM

(71) Applicant: Splunk Inc., San Francisco, CA (US)

(72) Inventors: Anish A. Shrigondekar, Sunnyvale, CA (US); Eric Bond, Sandpoint, ID (US); Dhananjay Koshe, Santa Clara, CA (US); Jagannath Kerai, Cupertino, CA (US); Michael C. Lin, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 16/248,626

(22) Filed: Jan. 15, 2019

(65) Prior Publication Data

US 2019/0147002 A1    May 16, 2019

Related U.S. Application Data

(63) Continuation of application No. 15/276,652, filed on Sep. 26, 2016, now Pat. No. 10,216,862.

(51) Int. Cl.
| G06F 7/00 | (2006.01) |
| G06F 16/903 | (2019.01) |
| G06F 16/901 | (2019.01) |
| G06F 16/904 | (2019.01) |
| G06F 16/25 | (2019.01) |

(52) U.S. Cl.
CPC ...... *G06F 16/90335* (2019.01); *G06F 16/254* (2019.01); *G06F 16/901* (2019.01); *G06F 16/904* (2019.01)

(58) Field of Classification Search
CPC ............. G06F 16/90335; G06F 16/254; G06F 16/901; G06F 16/904; G06F 17/30979; G06F 17/30994; G06F 17/30946
See application file for complete search history.

(56) References Cited

U.S. PATENT DOCUMENTS

| 5,724,475 A | * | 3/1998 | Kirsten ............ G08B 13/19645 |
| | | | 348/E7.086 |
| 5,734,884 A | * | 3/1998 | Eberhard ................. G06F 11/34 |
| 5,875,445 A | * | 2/1999 | Antonshenkov .... G06F 16/2462 |

(Continued)

OTHER PUBLICATIONS

Non-Final Office Action dated Aug. 7, 2018 for U.S. Appl. No. 15/276,652 of Shrigondekar et al., filed Sep. 26, 2016.

(Continued)

*Primary Examiner* — Mohammed R Uddin
(74) *Attorney, Agent, or Firm* — Perkins Coie LLP

(57) ABSTRACT

Disclosed herein is a data estimation technique for a data intake and query system. The system receives user inputs indicative that a first data source is to be the subject of a storage related estimate. The system receives a first plurality of events generated by the first data source. The system indexes only a sample of the received first plurality of events, based on a sampling criterion, where the sample is fewer than all of the first plurality of events. The system generates the storage related estimate based on at least some of the first plurality of events, and causes an indication of the estimate to be output to a user.

30 Claims, 14 Drawing Sheets

(56) References Cited

U.S. PATENT DOCUMENTS

| | | | | |
|---|---|---|---|---|
| 5,913,206 | A * | 6/1999 | Chaudhuri | G06F 16/22 |
| 6,314,418 | B1 * | 11/2001 | Namba | G06F 16/328 |
| | | | | 707/696 |
| 6,530,008 | B1 * | 3/2003 | Lin | G06F 16/21 |
| | | | | 711/171 |
| 7,962,489 | B1 * | 6/2011 | Chiang | G16B 30/00 |
| | | | | 707/741 |
| 7,974,969 | B1 * | 7/2011 | Balbirsky | G06F 16/217 |
| | | | | 707/713 |
| 7,979,439 | B1 * | 7/2011 | Nordstrom | G06F 16/22 |
| | | | | 707/741 |
| 8,458,065 | B1 * | 6/2013 | Zhang | G06Q 10/0639 |
| | | | | 705/35 |
| 9,053,167 | B1 * | 6/2015 | Swift | G06F 16/27 |
| 9,454,536 | B1 * | 9/2016 | Rao | G06F 11/1446 |
| 9,715,434 | B1 * | 7/2017 | Xu | G06F 11/1453 |
| 9,983,795 | B1 * | 5/2018 | Naamad | G06F 3/0629 |
| 2002/0194326 | A1 * | 12/2002 | Gold | G06F 11/008 |
| | | | | 709/224 |
| 2004/0103437 | A1 * | 5/2004 | Allegrezza | H04N 21/2225 |
| | | | | 725/95 |
| 2004/0225865 | A1 * | 11/2004 | Cox | G06F 16/2455 |
| | | | | 712/34 |
| 2005/0015547 | A1 * | 1/2005 | Yokohata | G06F 3/0605 |
| | | | | 711/114 |
| 2005/0149447 | A1 * | 7/2005 | Sherkow | G06Q 10/00 |
| | | | | 705/52 |
| 2005/0149462 | A1 * | 7/2005 | Lee | G06K 9/624 |
| | | | | 706/20 |
| 2005/0289108 | A1 * | 12/2005 | Carol | G06F 16/13 |
| 2006/0106852 | A1 * | 5/2006 | Siddall | G06F 16/1737 |
| 2006/0184529 | A1 * | 8/2006 | Berg | G06F 11/0784 |
| 2007/0198802 | A1 * | 8/2007 | Kavuri | G06F 3/0683 |
| | | | | 711/170 |
| 2008/0050025 | A1 * | 2/2008 | Bashyam | H04N 19/129 |
| | | | | 382/238 |
| 2008/0091583 | A1 * | 4/2008 | Gorton | G06Q 40/06 |
| | | | | 705/36 R |
| 2008/0141378 | A1 * | 6/2008 | Mclean | G06F 21/10 |
| | | | | 726/26 |
| 2008/0168002 | A1 * | 7/2008 | Kagarlis | G06Q 40/00 |
| | | | | 705/36 R |
| 2008/0282139 | A1 * | 11/2008 | Davis | G06F 40/174 |
| | | | | 715/205 |
| 2009/0281782 | A1 * | 11/2009 | Bitar | G06F 11/3409 |
| | | | | 703/21 |
| 2011/0060561 | A1 * | 3/2011 | Lugo | G06F 30/20 |
| | | | | 703/1 |
| 2011/0113365 | A1 * | 5/2011 | Kimmerly | G06F 9/451 |
| | | | | 715/806 |
| 2011/0282884 | A1 * | 11/2011 | Ma | G11B 27/309 |
| | | | | 707/741 |
| 2012/0144038 | A1 * | 6/2012 | Hildebrand | H04L 47/823 |
| | | | | 709/226 |
| 2012/0167111 | A1 * | 6/2012 | Fortune | G06F 9/81 |
| | | | | 718/104 |
| 2012/0179742 | A1 * | 7/2012 | Acharya | G08G 1/0175 |
| | | | | 709/202 |
| 2012/0239660 | A1 * | 9/2012 | Patel | G06F 16/2272 |
| | | | | 707/741 |
| 2013/0041871 | A1 * | 2/2013 | Das | G06F 16/134 |
| | | | | 707/662 |
| 2014/0081652 | A1 * | 3/2014 | Klindworth | G06Q 20/4016 |
| | | | | 705/2 |
| 2016/0092134 | A1 * | 3/2016 | Raitto | G06F 3/0608 |
| | | | | 711/118 |
| 2016/0127921 | A1 * | 5/2016 | Bhatia | H04M 15/49 |
| | | | | 455/405 |
| 2017/0293666 | A1 * | 10/2017 | Ragavan | G06N 5/02 |

OTHER PUBLICATIONS

Notice of Allowance dated Dec. 28, 2018 for U.S. Appl. No. 15/276,652 of Shrigondekar et al., filed Sep. 26, 2016.

* cited by examiner

STORAGE ESTIMATION IN A DATA INDEXING AND QUERY SYSTEM

This application is a continuation of U.S. patent application Ser. No. 15/276,652 filed on Sep. 26, 2016, which is incorporated by reference herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to a data intake and query system, and more particularly, to a technique for performing data estimation in a data intake and query system.

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF THE DRAWINGS

One or more embodiments of the present disclosure are illustrated by way of example and not limitation in the figures of the accompanying drawings, in which like references indicate similar elements.

FIG. 5A illustrates an example of a search screen of a search graphical user interface (GUI).

FIG. 5B illustrates an example of a data summary dialog of the search GUI.

DETAILED DESCRIPTION

Figure 1:
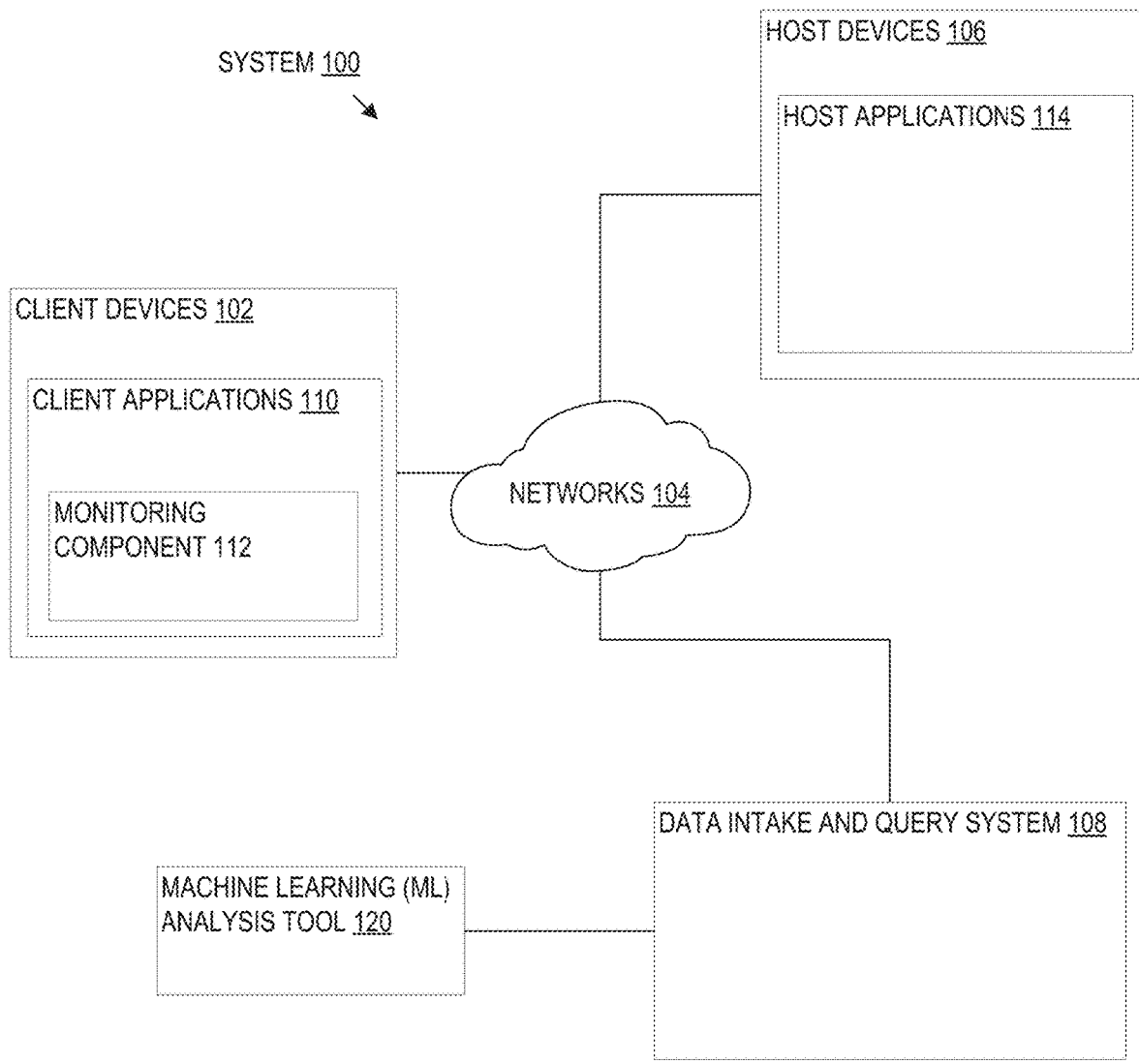
FIG. 1 illustrates a networked computer environment in which an embodiment may be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a data estimation technique that enables users to estimate the impact of adding new data sources to a system that indexes and stores data, particularly though not necessarily machine data. The system that indexes and stores data is also referred to herein as a data intake and query system, or more simply as "the system." Today, users of such systems do not have an easy way of estimating the volume of data or required storage space for their ingested data sources. To do so, users typically employ a variety of techniques, ranging from back-of-the-napkin calculations to elaborate spread-sheets, to control and filter the data that can be added to the system. These techniques have a significant amount of error and uncertainty, which often leads to users deciding not to add new data sources to the system out of an abundance of caution (e.g., to avoid exceeding a volume-based license for use of the system). Some of the data not added might have been valuable to the user or the user's organization had it been added to the system. Additionally, new users do not have an easy and accurate way to estimate data volume requirements and determine the license level for which they should budget.

Accordingly, the technique introduced here enables users to gauge the impact of new data sources on the system before the data sources are fully indexed and, therefore, before the data sources impact existing licenses. Further, the technique allows users to see what modifications to existing licenses would be required that if any, if the user were to choose to fully indexed the estimated data sources.

According to some embodiments, the data estimation technique includes enabling a user of the system to specify a data source to be estimated ("estimated data source") and a sampling rate at which to sample the estimated data source. Note that for convenience, a data source to be estimated is called an "estimated data source" herein even though an estimate for it may not yet have been generated. The system acquires and computes metadata for data from the estimated data source, and uses that metadata to compute various metrics about the estimated data/data source as a whole, which metrics are then used to compute various storage related estimates. The system then indexes (including committing to persistent storage) only a small portion of the data from that data source, as determined by the sampling rate. The sampling rate may be, for example, in the range of 0 to 5%. The system does not commit to persistent storage or otherwise fully index the remaining data from the estimated data source. The relatively small amount of data that is sampled and indexed can be searched, viewed and analyzed by the user just like any other indexed data, to allow the user to judge the value, relevance, etc. of data from the estimated data source.

In particular, the system computes estimates of the amount of storage space that would be required to fully index (including to persistently store) all data received from the estimated data source, along with any data from sources that are already being fully indexed, for various time intervals into the future (where the time intervals can be specified or modified by the user). The estimate may be output visually to the user, for example, in the form of one or more graphs. To facilitate comparison, the estimate may be provided with additional information indicating the amount of storage space that would be required to index and store only those data sources associated with the user that are currently being fully indexed, i.e., without the estimated data source, over the multiple time intervals. Additionally, a visual indication of how the above-mentioned storage levels relate to the user's existing use license may also be displayed, along with a visual indication of any modified license terms that would be needed to convert the estimated data source to a fully indexed data source. This technique, therefore, helps users of a data intake and query system predict which license levels will be most appropriate for their particular deployments.

Accordingly, the data estimation technique introduced here allows existing users to select new data sources in existing "Add Data" flows but designate the sources as estimation only (i.e., no impact to indexing/license use). It further allows users to estimate many sources of various types simultaneously, to project growth in data volumes over time based on estimated/historical growth, and to estimate licensing requirements if new data sources are indexed. Further, the technique allows easy transitioning of data sources from estimated real data sources into fully indexed data sources.

Various other features of the data estimation technique will become apparent from the description which follows. First, however, it is useful to consider an example of an environment and system in which the guidance technique may be employed, including a data intake and query system, as will now be described.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference herein in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
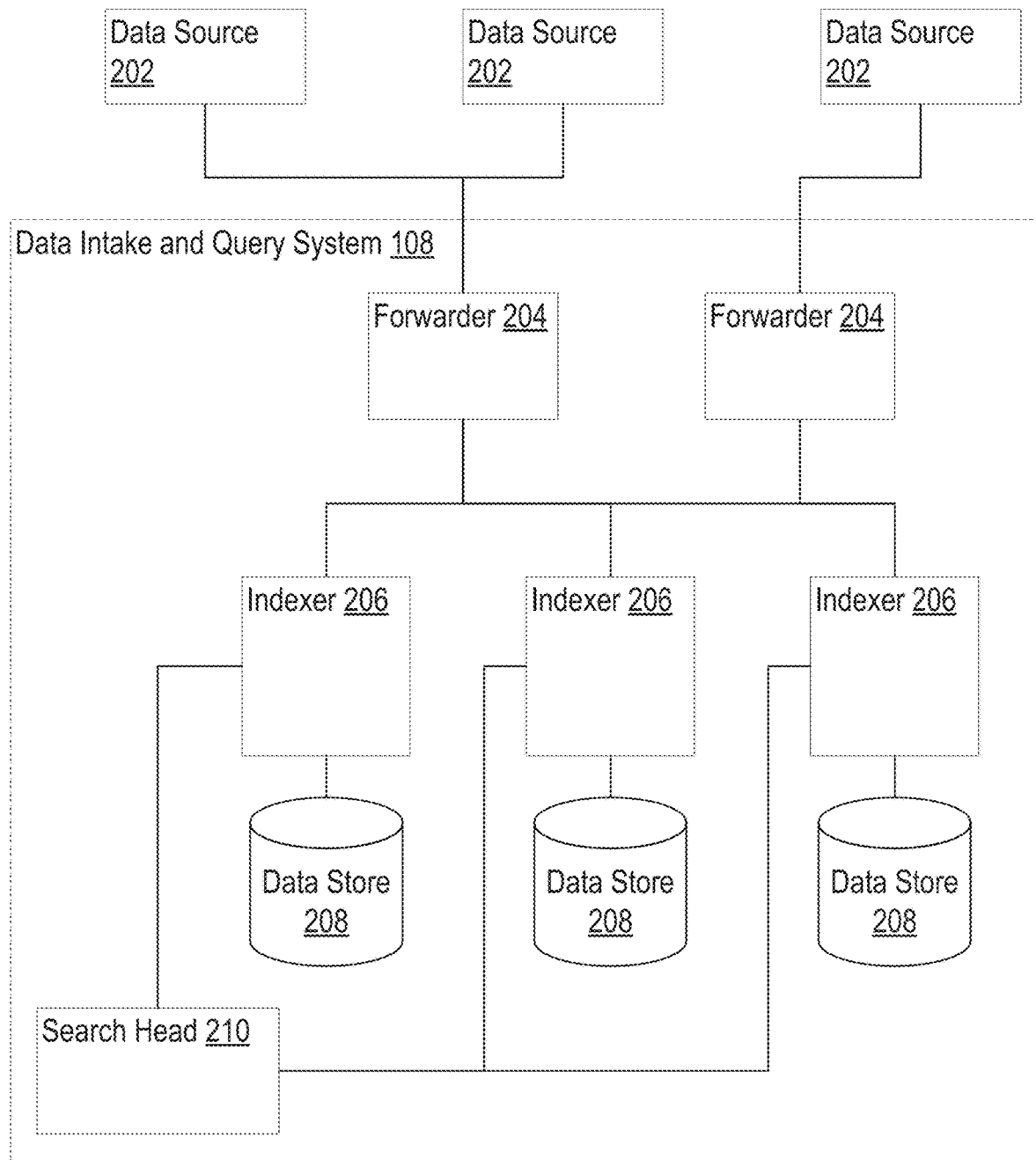
FIG. 2 illustrates a block diagram of an example data intake and query system in which an embodiment may be implemented.

FIG. 2 depicts a block diagram of an illustrative data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
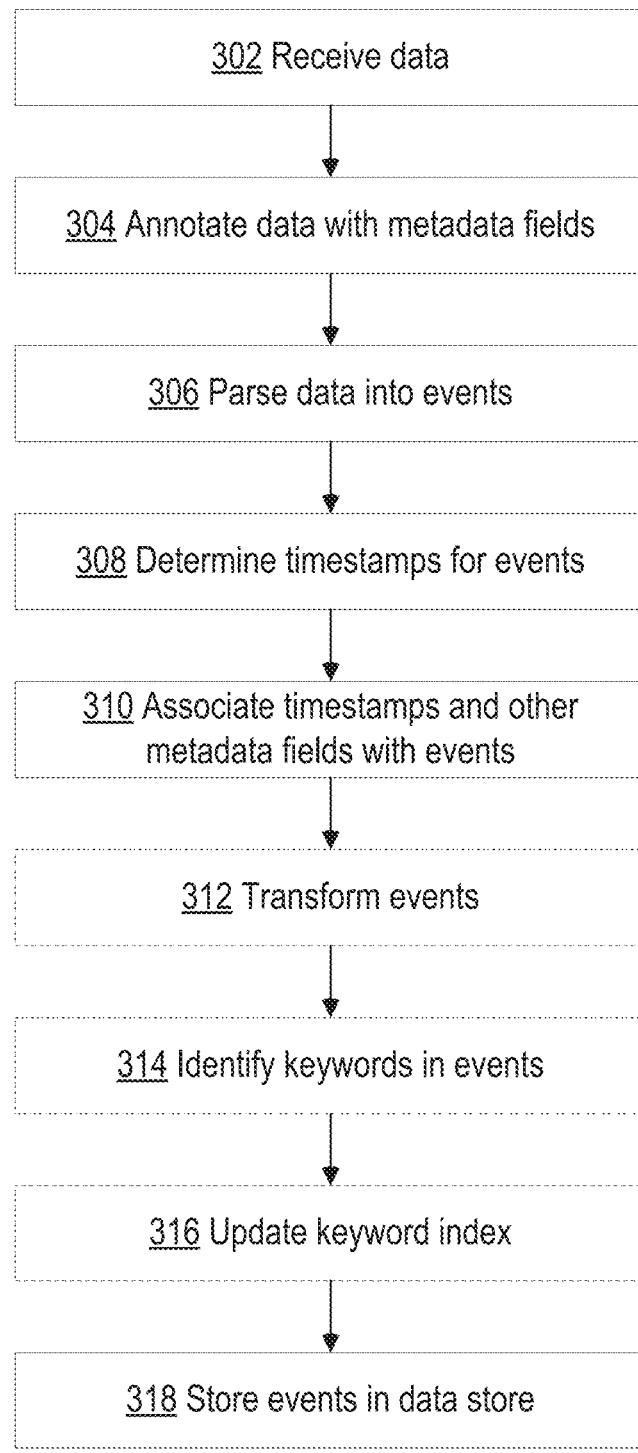
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. Pat. No. 9,130,971, entitled "SITE-BASED SEARCH AFFINITY", filed on 30 Apr. 2014, and in U.S. Pat. No. 9,124,612, entitled "MULTI-SITE CLUSTERING", also filed on 30 Apr. 2014, each of which is hereby incorporated by reference in its entirety for all purposes.

2.6. Query Processing

Figure 4:
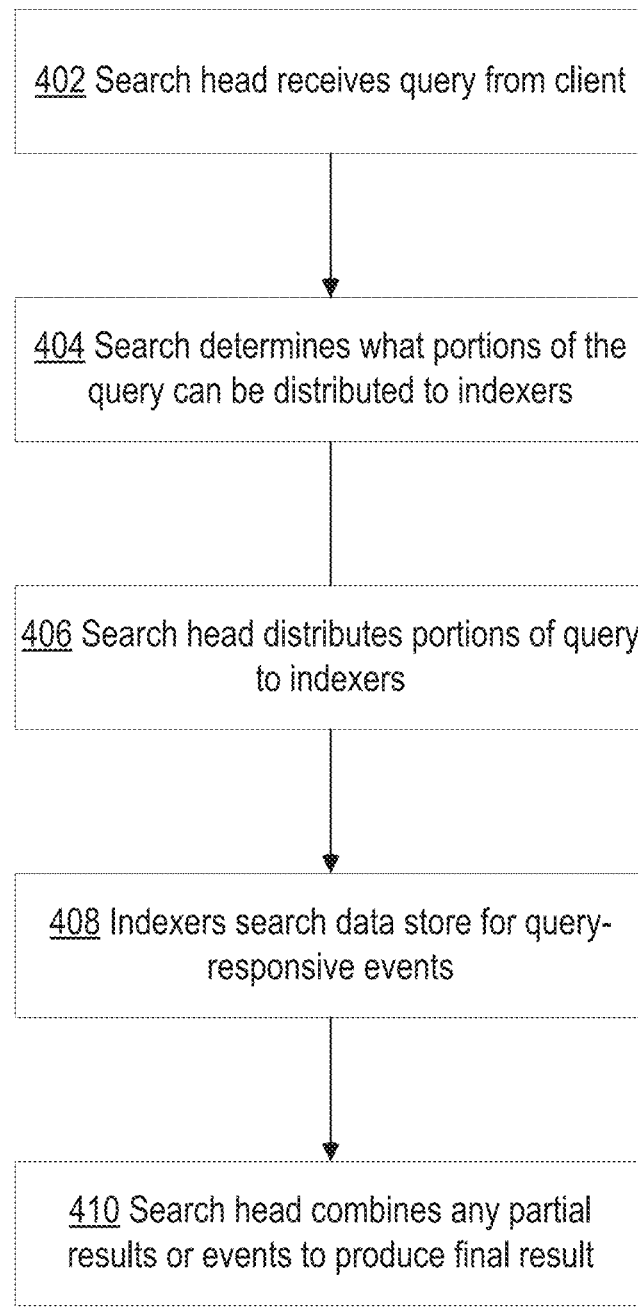
FIG. 4 is a flow diagram that illustrates how a search head and indexers perform a search query.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language (PSL) in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5A:
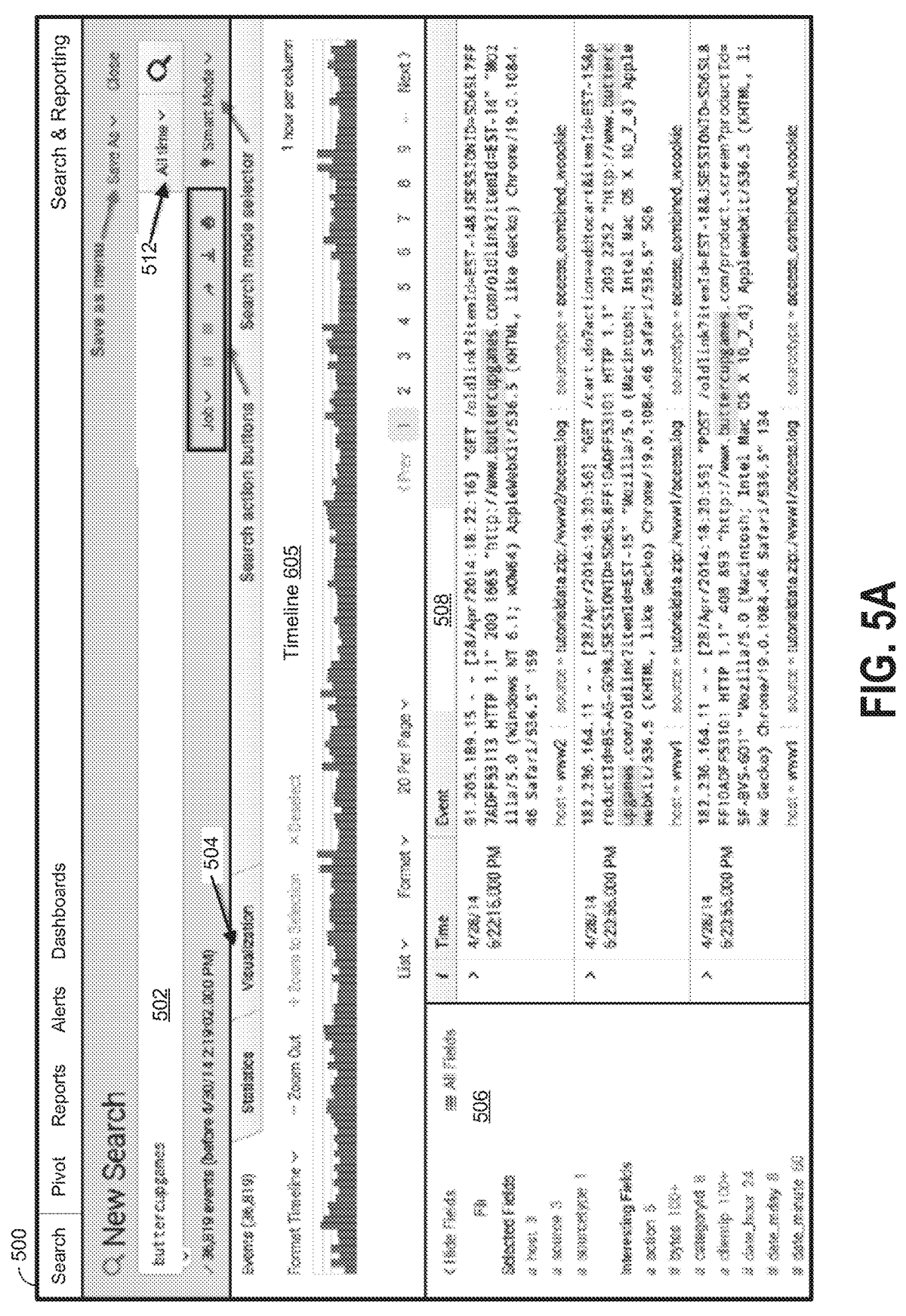

FIG. 5A shows an example of a search screen that may be generated by the search head 210 of data intake and query system 108. Search screen 500 includes a search bar 502 that accepts a user-input search query in the form of a search string (e.g., the string "buttercupgames" in the example of FIG. 5A). The search string can be in the form of a PSL query.

Figure 5B:
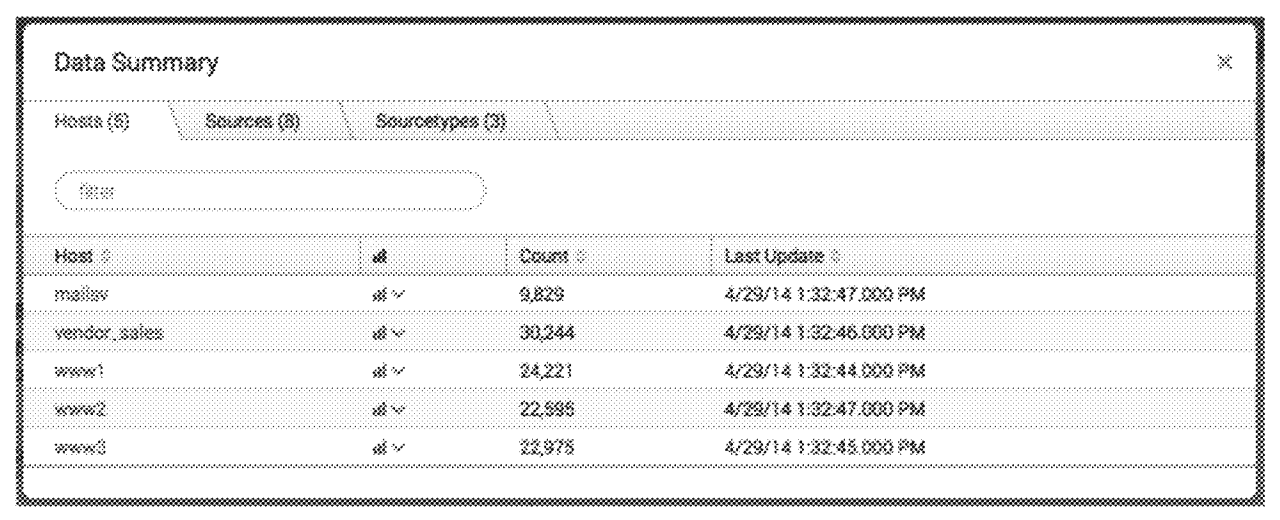

Search screen 500 also includes a time range picker 512 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 500 also initially displays a "data summary" dialog as is illustrated in FIG. 5B that enables the user to select from among different data sources for the event data, such as by selecting specific hosts and log files. In other cases, the data source may be selected via a command that is part of the search query itself, as described below.

After a search is executed, the search screen 500 in FIG. 5A can display the results through search results tabs 504, wherein search results tabs 504 includes: an "events tab" that includes a region 508 that displays various events returned by the search; a "statistics tab" that displays statistics about the search results; and a "visualization tab" that displays various visualizations of the search results.

2.8 Data Estimation

As described briefly above, a data intake and query system such as system 100 can implement, or can be used in conjunction with, a data estimation technique that enables users to estimate the impact of adding new data sources to the system. Accordingly, introduced here is such a technique. The technique enables users to gauge the impact of new data sources on the system before the data sources are fully indexed and, therefore, before the data sources impact existing licenses. Further, the technique allows users to see what modifications to existing licenses would be required that if any, if the user were to choose to fully indexed the estimated data sources.

According to some embodiments, the data estimation technique enables a user to specify a data source to be estimated ("estimated data source") and a sampling rate at which to sample the estimated data source. The system acquires and computes metadata for all of the data received by the system from the estimated data source, not just the sampled data, and uses that metadata to compute various metrics about the estimated data/source as a whole, which are then used to compute various storage related estimates. The system then indexes only a small portion of the data received from the data source, according to the sampling rate, which may be, for example, in the range of 0 to 5%, or some other relatively small fraction of the total amount of data received from that data source. In this context, indexing data includes at least parsing the raw data into events, committing those events to persistent storage and generating or updating an index representing those events (e.g., a keyword index), but may also include timestamping the events and/or other operations.

In particular, the system computes estimates of the amount of storage space that would be required to fully index (including to persistently store) all data received from the estimated data source (with all other data already being fully indexed for the user), for various time intervals into the future (where the time intervals can be specified or modified by the user). The estimate may be output visually to the user; for example, the estimate may be or include a bar graph depicting the amount of storage space that would be required to index and store all data sources associated with the user, including the estimated data source, over multiple time intervals into the future. To facilitate comparison, the bar graph may be overlaid on, or shown in proximity to, another bar graph depicting the amount of storage space that would be required to index and store only those data sources associated with the user that are currently being fully indexed, i.e., without the estimated data source, over the multiple time intervals. Other types of visualizations could be alternatively or additionally employed. Additionally, a visual indication of how the above-mentioned storage levels relate to the user's existing use license may also be displayed, along with a visual indication of any modified license terms that would be needed to convert the estimated data source to a fully indexed data source. This technique, therefore, helps users of a data intake and query system predict which license levels will be most appropriate for their particular deployments.

Accordingly, the data estimation technique introduced here allows existing users to select new data sources in existing "Add Data" flows but designate the sources as estimation only (i.e., no impact to indexing/license use). It further allows users to estimate many sources of various types simultaneously, to project growth in data volumes over time based on estimated/historical growth, and to estimate licensing requirements if new data sources are indexed. Further, the technique allows easy transitioning of data sources from estimated real data sources into fully indexed data sources.

Figure 6:
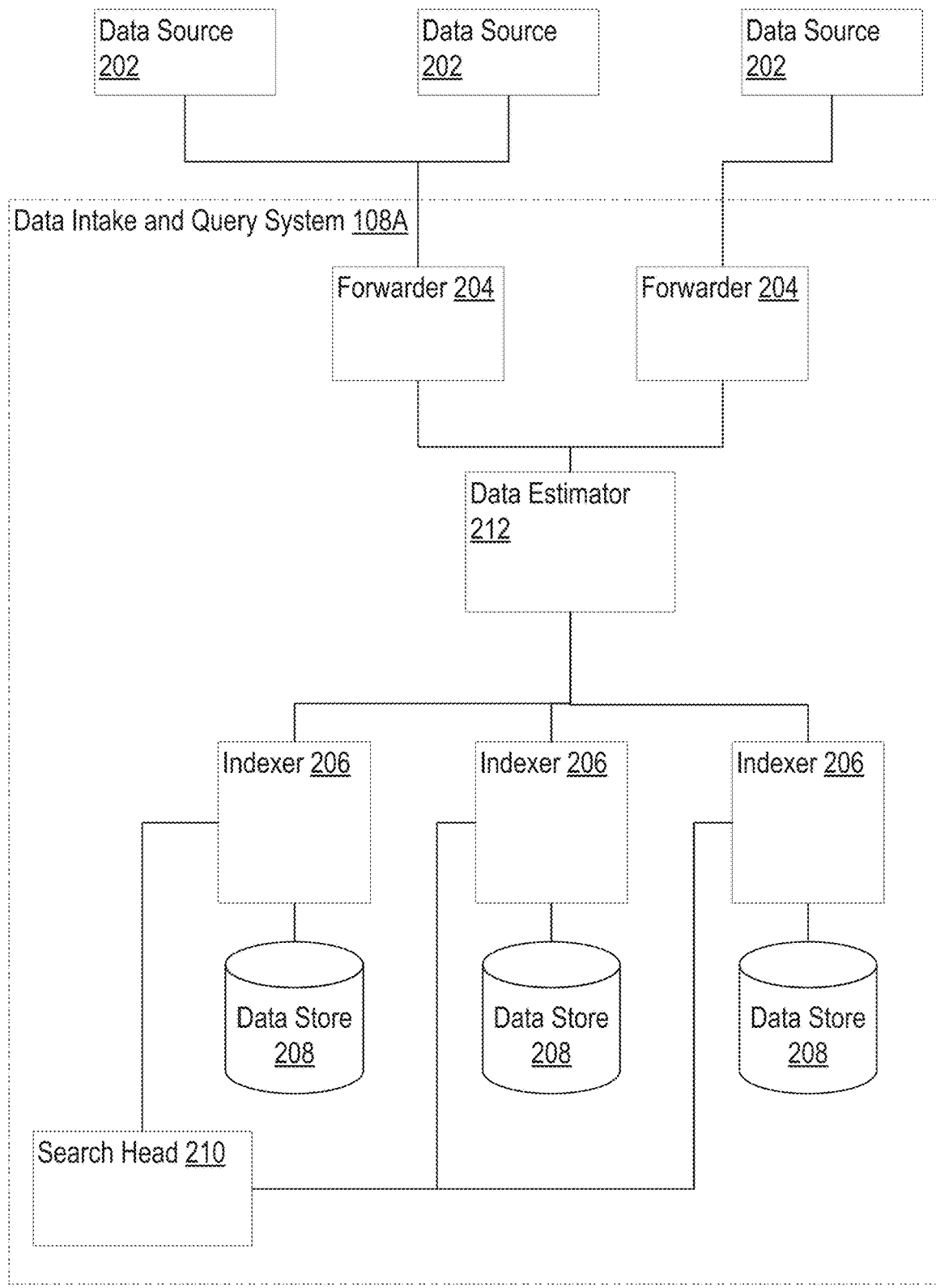
FIG. 6 shows a variation of the data intake and query system that includes a data estimator.

FIG. 6 shows a data intake and query system 108A, which is similar in architecture and function to the data intake and query system 108 of FIG. 2, modified to include a data estimator 212 that implements the data estimation related functions described herein. In certain embodiments, the data estimator 212 may be implemented at least partially by application level code in the system 108A. In the illustrated embodiment, the data estimator 212 operates functionally between the forwarders 204 and the indexers 206. In other embodiments, the data estimator 212 may operate in a different location or locations in the system 108A; further, in some embodiments the data estimator 212 may be distributed among multiple locations in the system 108A.

Figure 7:
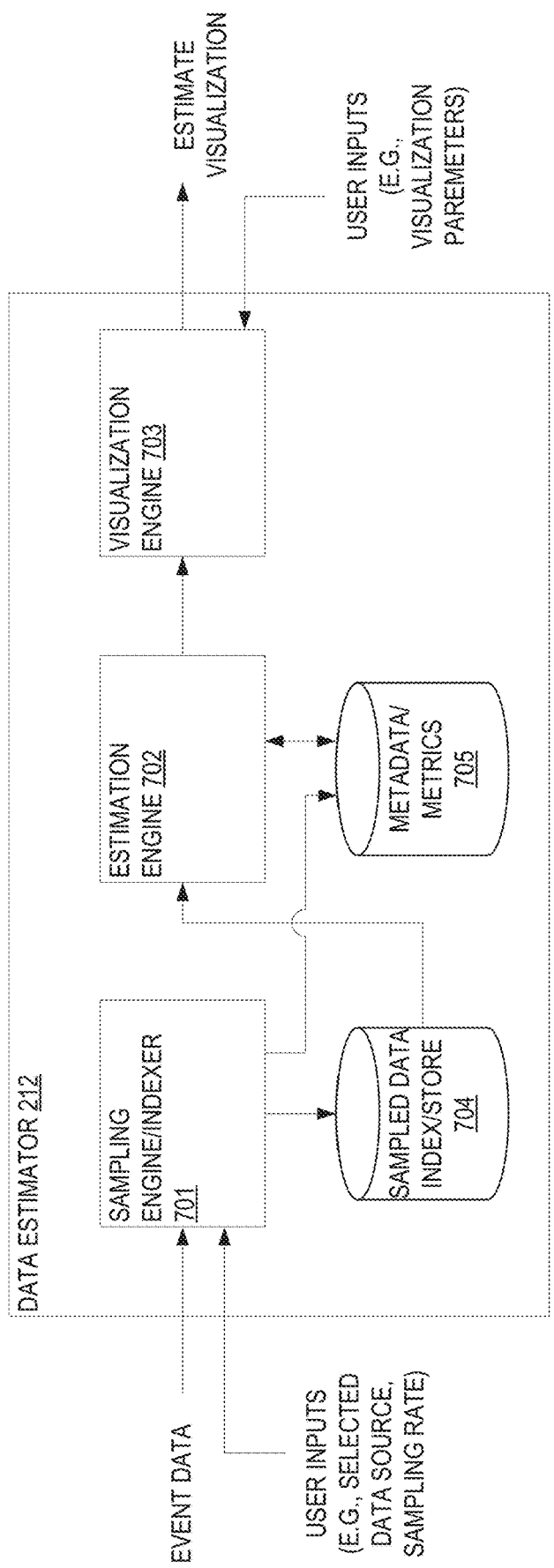
FIG. 7 illustrates an example of certain relevant details of the data estimator.

FIG. 7 illustrates an example of certain relevant details of the data estimator 212, according to certain embodiments. In the represented embodiments, the data estimator 212 includes a sampling engine/indexer 701, an estimation engine 702, a visualization engine 703, a sampled data index/store 704 and a metadata/metrics store 705. The sampling engine/indexer 701 is responsible for sampling and indexing, at a user-specified (or default) sampling rate, data received by the system 108A from each identified estimated data source. The indexed data is stored in the sampled data index/store 704, which is a persistent storage dedicated for storing only sampled data from estimated data sources and is logically separate from the storage used for indexed data. In addition, the sampling engine/indexer 701 also collects metadata from the data received from estimated data sources, computes metrics based on those metadata, and stores those metadata and metrics in data store 705. The metadata and metrics may include, for example, values and/or statistics representing or indicative of the number and/or size of events defined from the received data, impact on CPU utilization, memory utilization, input/output (I/O) utilization, network performance, search performance, indexing performance, etc. The estimation engine 702 is responsible for generating the storage related estimates for the estimated data source, based on the associated metadata and metrics. Any of various algorithms can be used to compute the estimates, the details of which are not necessary for understanding the technique introduced here. The visualization engine 703 receives the estimates from the estimation engine 702 and outputs various associated visualizations, as described above and is further described below.

Figure 8:
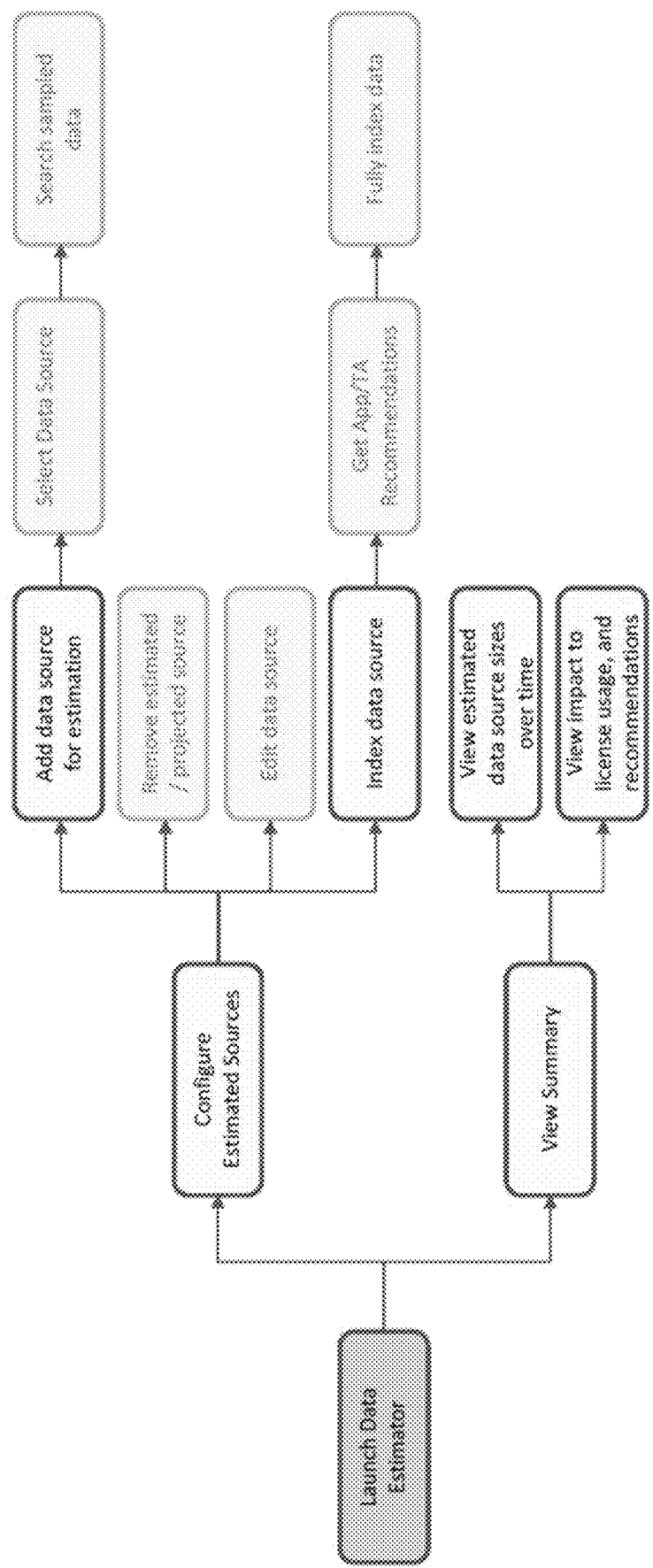
FIG. 8 illustrates an example of usage flows for the data estimator.
Figure 9:
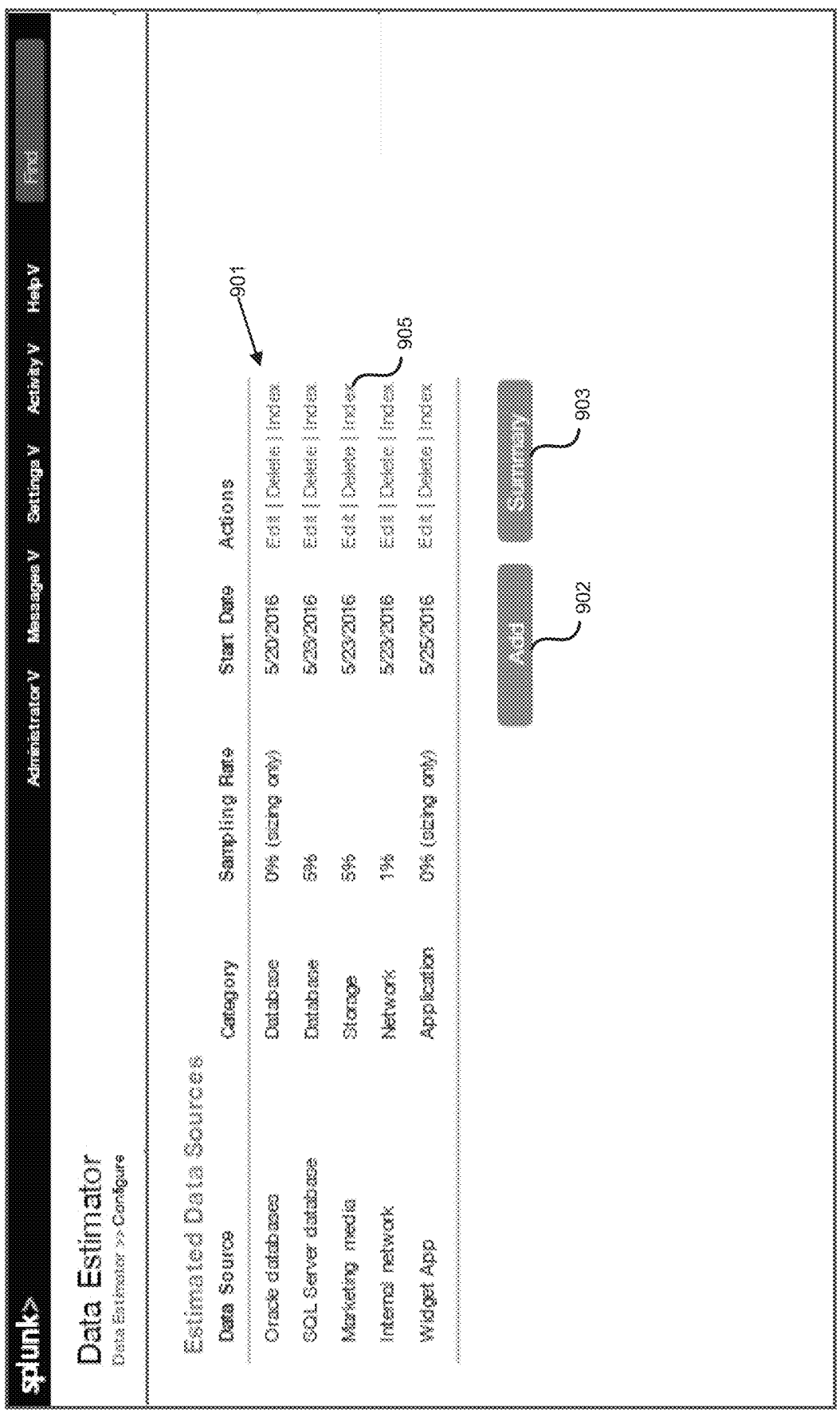
FIG. 9 shows an example of a configuration screen by which a user can configure data sources.
Figure 10:
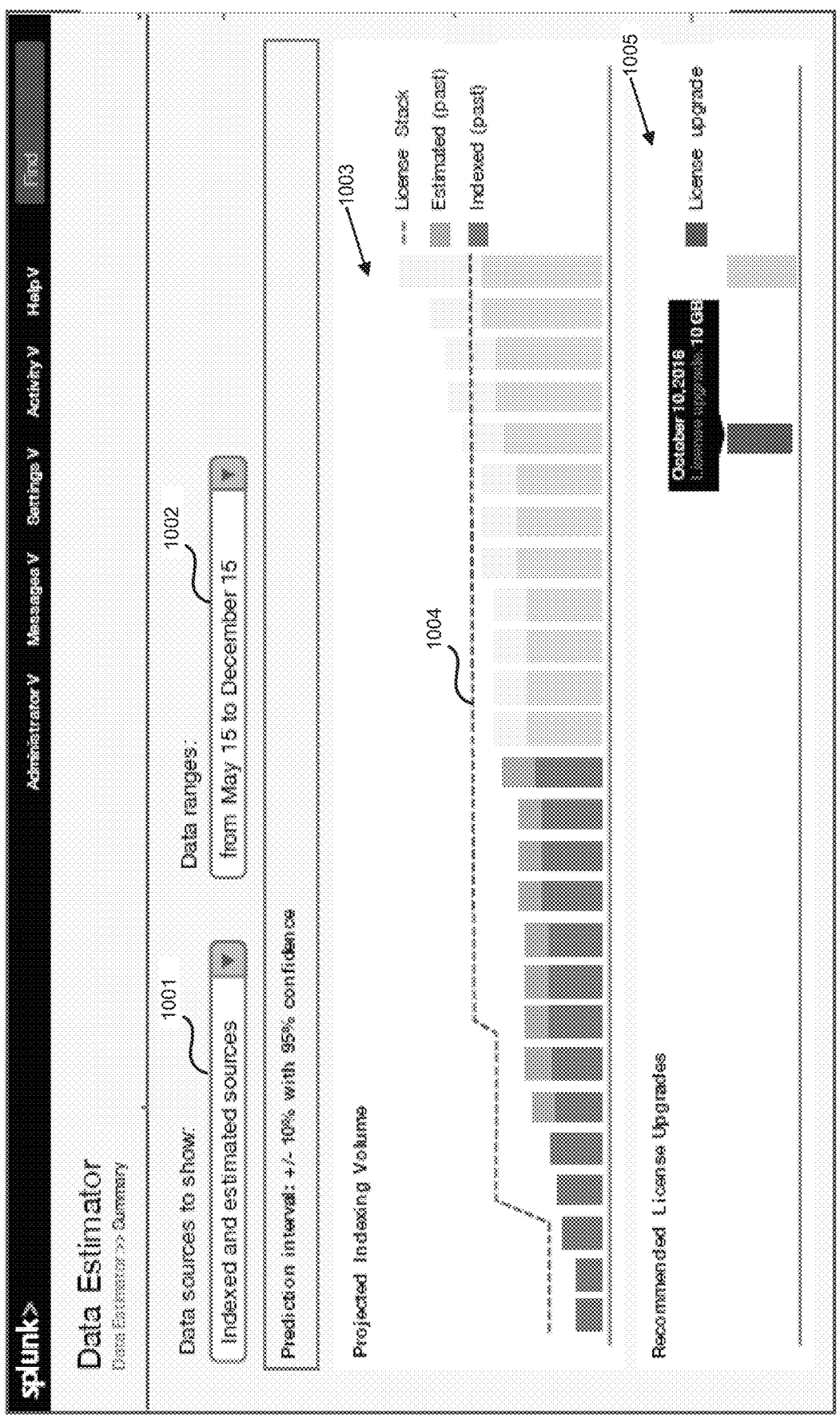
FIG. 10 shows an example of a summary view screen for viewing estimates of data sources' impacts on storage and licenses.
Figure 11:
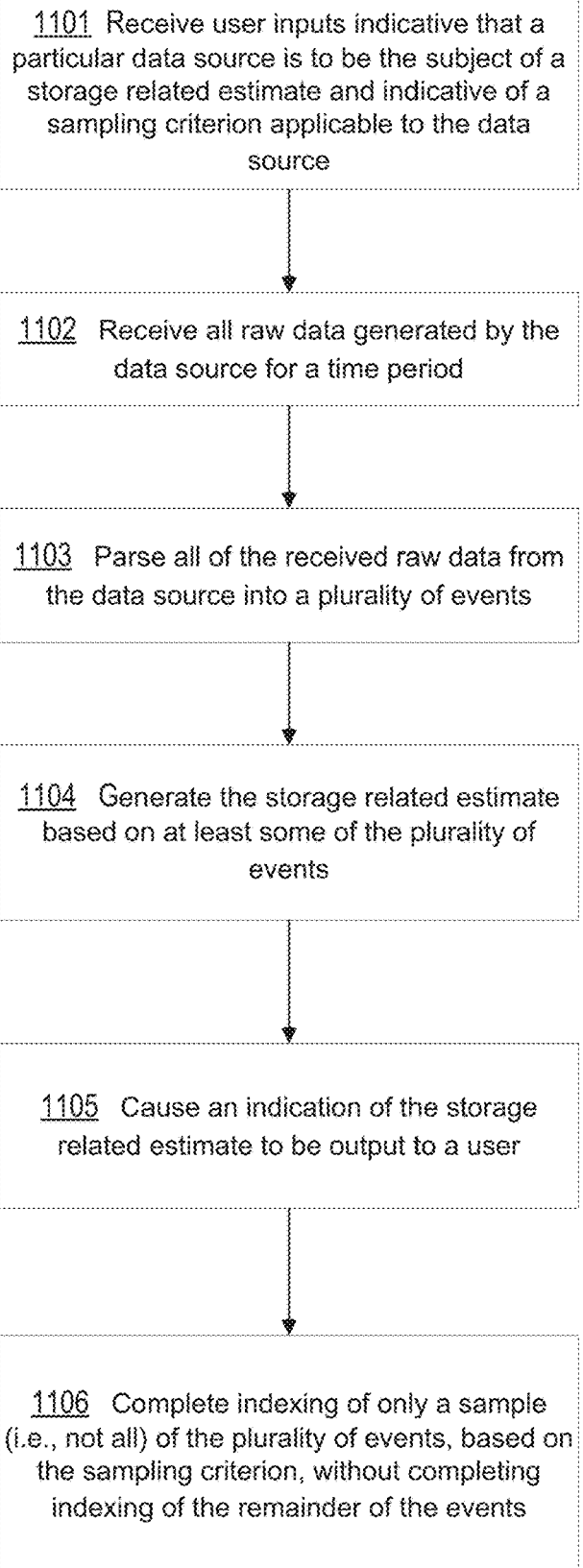
FIG. 11 is a flowchart illustrating an example of an overall process that can be performed by the data estimator.

FIG. 8 illustrates an example of usage flows for the data estimator 212. FIGS. 9, 10 and 11 show examples of display screens that may be presented with the user in connections some of those usage flows. After launching the data estimator 212, the user can choose to go to display screens for performing functions such as configuring estimated data sources or seeing a summary view of data sources and their storage impacts. Configuring estimated data sources involves managing data sources being estimated or to be estimated, such as by adding and deleting data sources, or transitioning an estimated data source to an indexed data source. As used herein, an "indexed" data source or "fully indexed" data source means that all data received by the system from that data source gets indexed, in contrast with an estimated data source, only a small sample of which gets indexed. From the configuration screen, therefore, the user can choose to add a data source for estimation, remove an estimated data source (i.e., a data source that is already the subject of estimation), edit properties of an estimate data source (e.g., path, source type, indexed extractions, regular expressions), or convert an estimated data source to an indexed data source (i.e., "index a data source").

After adding a data source, the user can choose to select an estimated data source, search its (sampled) data (e.g., by applying PSL search queries to the indexed data from that source, as described above) and view the search results. This feature allows the user to preview the data from that source to judge its usefulness. If the user selects the option to index a data source, the user can then choose to view recommendations by the data estimator 212 ("Get App/TA Recommendations") on which apps and technology add-ons the user should install based on the data that they are ingesting. These recommendations can be provided based on the contextual and metadata information than actually inspecting the raw data. The user can then trigger the system to fully index the data from the data source.

As mentioned above, the user can also choose to view a summary of data sources and their storage impacts. The summary view may include viewing data source sizes over time for one or more estimated data sources, viewing the impact on license usage and corresponding license recommendations, or a combination of these and/or other information.

FIG. 9 shows an example of a configuration screen by which a user can configure data sources. The configuration screen includes a list of all estimated data sources along with controls 901 (e.g., links) to invoke functions/screens to edit an estimated source, delete an estimated data source or transition an estimated data source to an indexed data source. For each estimated data source the configuration screen also shows a category, selected sampling rate and date on which estimation began for that source. As noted above, estimated data sources are sampled at a sampling rate, such as a rate in the range of 0-5%, for example. This means that, for example, if a data source were to be sampled at 5%, then only 5% of all events received from that data source by the system will be indexed. The configuration screen further includes an Add button 902 to take the user to a screen to add an estimated data source and a Summary button 903 to take the user to a screen containing a summary view, which are described below.

To add a data source the user can simply select a data source from among all data sources know to the data intake and query system (by using any convenient form of user interface control, e.g., a pull-down list), or the user can specify a filename and pathname to the data source. Alternatively or additionally, the user may be allowed to select a class of data sources as sources to be estimated, e.g., by specifying a source type. The user may designate a data source as an estimated data source either before or after specifying/selecting the data source, using any convenient form of user interface control (e.g., by clicking on either a checkbox labeled "Estimated Data Source" or a checkbox labeled "Indexed Data Source" as appropriate, next to the name of the data source).

After a data source has been added as an estimated data source, the user can choose to view all sampled (indexed) events from that data source, including the raw data of those events, to judge its usefulness/value for possible indexing. The events may be presented in the form of a list such as shown in FIG. 5A, for example. Further, the user can enter a PSL search query into a search bar and/or filter the sampled data by various criteria, and view the results in the same manner as described above for fully indexed data; however, unlike with fully indexed data, the data subject to search or filtering for an estimated data source generally is only a small fraction of all data received from the estimated data source.

A user can choose to view a summary of one or more data sources and their impacts on storage space and license usage, including the estimate(s) mentioned above. FIG. 10 shows an example of a summary view screen. The illustrated screen includes a pull-down menu 1001 to enable the user to select the data source(s) to summarize, which may include all indexed and estimated data sources, only estimated data sources or only indexed data sources. Further, though not shown in FIG. 10, the summary screen may also allow the user to identify a specific one or more data sources (estimated or indexed) to include in the summary. The summary screen also includes another pull-down menu 1002 to enable the user to select a data range through which the summary view will apply (which may include an option not to apply any data restriction).

The summary screen also includes a summary visualization 1003, which includes the computed estimate(s) for each estimated data source. In certain embodiments, as shown in FIG. 10, the estimate is in the form of a bar graph of indexed and/or estimated data sources over a time range, where each bar represents the volume (amount) of data indexed or to be indexed for a given period of time. In certain embodiments, darker bars represent past time intervals through the present time while lighter bars represent time intervals in the future; in this manner, the visualization provides a predictive estimate. Additionally, the summary includes an indication of what volume of indexing or storage the user's current license allows, which in FIG. 10 is in the form of a dashed line 1004. In a similar manner the data estimator 212 may additionally or alternatively provide predictive estimates of CPU utilization, memory utilization, network performance, search performance, and/or other parameters related to indexing or storage of data.

The summary view further may include a recommendation 1005 for an upgrade to a specific license level, based on the computed estimate(s). By using a view such as shown in FIG. 10, the user can quickly and easily predict what their storage and license requirements are likely to be in the future for various data sources that are not yet being indexed. If the user at any time decides to convert an estimated data source into an indexed data source, the user can do so by clicking a control, such as an Index link 905 in FIG. 9, to go to the appropriate user interface screen. The user will then be taken to a screen in which he or she can select or specify the production index into which data from the (formerly estimated) data source will be indexed.

To better understand how the data estimator 212 can perform predictive estimation, consider the following examples: An ecommerce user may have a data ingestion pattern that is well defined, where there are ingestion spikes at night when their information technology (IT) maintenance systems run or during heavy ecommerce periods such as Christmas and other holidays. The data estimator 212 can track these patterns and include them in its computations to estimate ingestion volume, indexing performance, etc. for that user. Similarly, to predict CPU performance, the data estimator 212 can look at the architecture and operating system (OS) specifications, current levels of saturation, etc., to make predictive estimations. Further, the data estimator 212 can employ machine learning algorithms/models to provide customized suggestions on a per-deployment basis. As another example of predicting indexing and search performance, the data estimator 212 can look at the number of searches being run and at the data distribution, throughput and latency levels, to predict estimated impact on existing workloads.

FIG. 11 shows an example of an overall process that can be performed by a system such as data intake and query system 108A described above. At step 1101 the data estimator 212 receives user inputs indicative that a particular data source is to be the subject of a storage related estimate and indicative of a sampling criterion applicable to the data source. At step 1102 the system receives all of the raw data generated by the data source (i.e., the data source to be estimated, also called "estimated data source") for a time period. At step 1103 the system parses all of the received raw data into a plurality of events. As described above, parsing the raw data into events is one aspect of indexing data. The complete process of indexing further includes committing the events to persistent storage and generating or updating an index representative of those events, such as a keyword index (not necessarily all in that order). In some embodiments, indexing may also include generating a timestamp and/or other metadata for each event and adding the timestamps (and/or other metadata) to the events, and/or other operations.

At step 1104 the data estimator 212 generates the storage related estimate based on at least some of the plurality of events. In some embodiments, the estimate is based on all of the plurality of events, which contain all of the raw data received by the system from the data source for the given time period. At step 1105 the data estimator 212 causes an indication of the storage related estimate to be output to a user, which may be at least partly in the form of a graphical visualization such as shown in FIG. 10. Causing the indication to be displayed to the user may include sending display data and/or display related instructions and/or signals to a local or remotely connected display device.

The system then completes indexing of only a sample (i.e., not all) of the plurality of events from the data source at step 1106, based on the user-specified sampling criterion. The system does not complete indexing of the remainder of the plurality of events (i.e., events outside the sample), unless and until a user requests that the data source be indexed. The sampled and indexed data can be searched, viewed and analyzed by the user just like any other data indexed by the system. Note that the above-described steps of FIG. 11 do not all have to be performed in the order stated above, as will be recognized by those skilled in the art. For example, the storage related estimate can be generated and/or output either before or after completing the indexing of the sample of the plurality of events.

Figure 12:
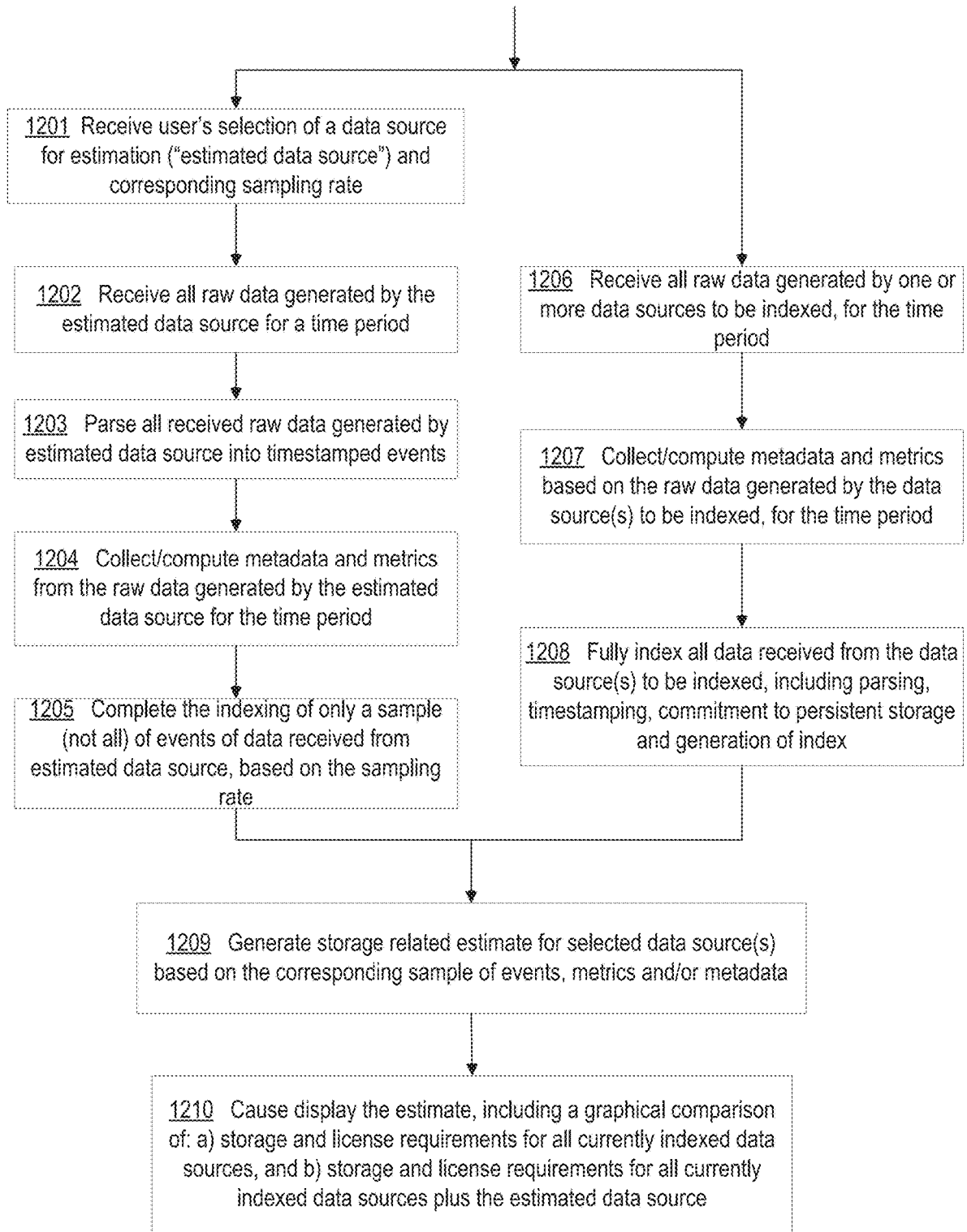
FIG. 12 shows an example of a specific process that can be performed by a data intake and query system including the data estimator.

FIG. 12 shows a more specific example of a process that can be performed by a system such as system 108A. At step 1201 in FIG. 12, the data estimator 212 receives a user's selection of a data source for estimation ("estimated data source") and corresponding sampling rate. At step 1202 the system receives all raw data generated by the estimated data source for a time period. The system parses all of the received raw data into events and timestamps those events at step 1203 (this is one aspect of indexing, as noted above). At step 1204 the data estimator 212 collects and/or computes metadata and metrics for all of the received raw data from the estimated data source data source, for that time period, based on the timestamped events, and stores them in a metrics database. In some embodiments, metadata may alternatively or additionally be collected/computed before the data is parsed into events. At step the system completes indexing of only a sample (e.g., no more than 5%) of the events received from the estimated data source, based on the user-specified sampling rate. The sampling of the events can also be based on, among other things, a prioritization based on how busy the indexers are with processing data from sources designated to be indexed. In this context, as in FIG. 11, complete indexing includes at least parsing the raw data into events (as performed in step 1203), committing the events to persistent storage and generating or updating an index (e.g., keyword index) representing the events. Indexing of other events from the estimated data source (i.e., other than the sampled events), including commitment to persistent storage, is not completed unless and until a user input is received indicating that the estimated data source is to be treated as an indexed data source.

As explained above, the sampled data of the estimated data source may be stored in a dedicated persistent storage for estimated data sources. The sampled data can then be searched, viewed and analyzed by the user just like any other data indexed by the system. Additionally the user may be enabled to search, view and analyze the sampled events from the estimated data source even before they have been indexed or committed to persistent storage, e.g., as a live event stream.

Concurrently with any one or more of steps 1201 through 1205, the system may also receive, at step 1206, raw data generated by one or more data sources that have been designated to be indexed, for the same or similar time period as mentioned above. Hence, at step 1207 the system collects/computes metadata and metrics based on the raw data generated by the data source(s) to be indexed, for that time period. At step 1208 the system fully indexes all of the raw data received from the data sources to be indexed, including parsing the data into events, timestamping the events, committing the events to persistent storage, and generating or updating an index for those events. As noted above, the indexed data may be stored in a persistent storage separate from that of the indexed sampled data from any estimated data source(s).

The system then at step 1209 generates a storage related estimate for one or more selected data sources, based on the corresponding sampled events, metrics and/or metadata. Note that the estimate in some instances may be generated before the corresponding events have been indexed or committed to persistent storage. At step 1210 the data estimator 212 causes display of the estimate, which in certain embodiments includes a graphical comparison of: a) storage and license requirements for all currently indexed data sources, and b) storage and license requirements for all currently indexed data sources plus the estimated data source.

Figure 13:
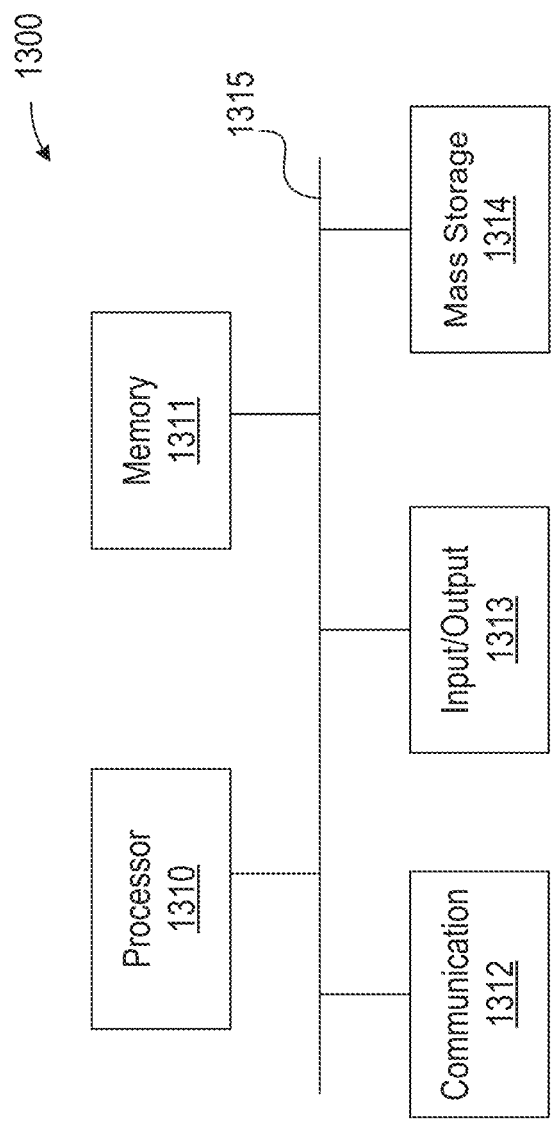
FIG. 13 shows a high-level example of a hardware architecture of a processing system that can be used to implement the data estimation technique and other techniques disclosed herein.

FIG. 13 shows a high-level example of a hardware architecture of a processing system that can be used to implement any one or more of the functional components referred to above (e.g., the tool, forwarders, indexer, search head, data store). One or multiple instances of an architecture such as shown in FIG. 13 (e.g., multiple computers) can be used to implement the techniques described herein, where multiple such instances can be coupled to each other via one or more networks.

The illustrated processing system 1300 includes one or more processors 1310, one or more memories 1311, one or more communication device(s) 1312, one or more input/output (I/O) devices 1313, and one or more mass storage devices 1314, all coupled to each other through an interconnect 1315. The interconnect 1315 may be or include one or more conductive traces, buses, point-to-point connections, controllers, adapters and/or other conventional connection devices. Each processor 1310 controls, at least in part, the overall operation of the processing device 1300 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 1311 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 1314 can be or include one or more hard drives, digital versatile disks (DVDs), flash memories, or the like. Each memory 1311 and/or mass storage 1314 can store (individually or collectively) data and instructions that configure the processor(s) 1310 to execute operations to implement the techniques described above. Each communication device 1312 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 1300, each I/O device 1313 can be or include a device such as a display (which may be a touch screen display), audio speaker, keyboard, mouse or other pointing device, microphone, camera, etc. Note, however, that such I/O devices may be unnecessary if the processing device 1300 is embodied solely as a server computer.

In the case of a user device, a communication device 1312 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 1312 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving, by a data intake and query system, user input indicative that a first data source is to be a subject of a storage related estimate;
receiving, by the data intake and query system, raw data generated by the first data source;
parsing, by the data intake and query system, the raw data generated by the first data source into a first plurality of events;
generating the storage related estimate, by the data intake and query system, based on at least some of the first plurality of events;
causing an indication of the storage related estimate to be output to a user of the data intake and query system; and
completing, by the data intake and query system, an indexing of only a sample of the received first plurality of events based on a sampling criterion, the sample being fewer than all of the first plurality of events, and not completing indexing of a remainder of the first plurality of events in the absence of a user input indicative that the first data source should be indexed, wherein completing indexing includes committing data being indexed or to be indexed to persistent storage.

2. A method as recited in claim 1, wherein generating the storage related estimate is based on a prioritization of the first data source in relation to at least one data source that is being fully indexed or that is to be fully indexed.

3. A method as recited in claim 1, wherein the storage related estimate comprises a storage indication of an amount of storage space that would be needed for the data intake and query system to index, including to persistently store, all data received by the data intake and query system from the first data source for a time period;

the method further comprising:
causing to be output to the user, in association with the storage indication, an indication of an amount of storage space that would be needed if the data intake and query system were not to index or store any data from the first data source for the time period.

4. A method as recited in claim 1, wherein the storage related estimate comprises a license indication of a license requirement for the data intake and query system to index, including to persistently store, all data received by the data intake and query system from the first data source for a time period.

5. A method as recited in claim 1, wherein the storage related estimate comprises a license indication of a license requirement for the data intake and query system to index, including to persistently store, all data received by the data intake and query system from the first data source for a time period;
the method further comprising:
causing to be output to the user, in association with the license indication, an indication of a current license associated with the user.

6. A method as recited in claim 1, wherein the storage related estimate comprises:
a storage indication indicative of an amount of storage space that would be needed for the data intake and query system to index, including to persistently store, all data received by the data intake and query system from the first data source for a time period; and
a license indication indicative of a license requirement for the data intake and query system to index, including to persistently store, all data received by the data intake and query system from the first data source for the time period;
the method further comprising:
causing to be output to the user, in association with the storage indication,
an indication of an amount of storage space that would be needed if the data intake and query system were not to index or store any data from the first data source for the time period, and
an indication of a current license associated with the user.

7. A method as recited in claim 1, further comprising:
receiving, by the data intake and query system, second data from a second data source that has been designated to be indexed, the second data including a second plurality of events;
completing indexing, by the data intake and query system, of all of the second plurality of events.

8. A method as recited in claim 1, wherein the storage related estimate comprises an indication of a license upgrade required for the data intake and query system to index, including to persistently store, all data received by the data intake and query system from the first data source for a time period.

9. A method as recited in claim 1, wherein causing an indication of the storage related estimate to be output to the user comprises generating and causing to be displayed a graphical indication that includes:
a first graphical element indicative of a total amount of data to be indexed by the data intake and query system for a time period if the data intake and query system were not to index any data from the second data source; and
a second graphical element indicative of a total amount of data to be indexed by the data intake and query system if the data intake and query system were to index all data received from the second data source, for the time period.

10. A method as recited in claim 1, wherein causing an indication of the storage related estimate to be output to the user comprises generating and causing to be displayed a graphical indication that includes:
a first graphical element indicative of a total amount of data to be indexed by the data intake and query system for a time period if the data intake and query system were not to index any data from the second data source; and
a second graphical element indicative of a total amount of data to be indexed by the data intake and query system if the data intake and query system were to index all data received from the second data source, for the time period; and
wherein one of the first graphical element or the second graphical element is overlaid on the other of the first graphical element or the second graphical element.

11. A method as recited in claim 1, wherein causing an indication of the storage related estimate to be output to the user comprises generating and causing to be displayed a graphical indication that includes:
a first graphical element indicative of a total amount of data to be indexed by the data intake and query system for a time period if the data intake and query system were not to index any data from the second data source; and
a second graphical element indicative of a total amount of data to be indexed by the data intake and query system if the data intake and query system were to index all data received from the second data source, for the time period;
the method further comprising:
causing to be output to the user an indication of a current license associated with the user, in proximity to the first and second plurality of graphical elements.

12. A method as recited in claim 1, wherein causing an indication of the storage related estimate to be output to the user comprises generating and causing to be displayed a graphical indication that includes:
a first graphical element indicative of a total amount of data to be indexed by the data intake and query system for a time period if the data intake and query system were not to index any data from the second data source; and
a second graphical element indicative of a total amount of data to be indexed by the data intake and query system if the data intake and query system were to index all data received from the second data source, for the time period;
the method further comprising:
causing to be output to the user an indication of a license requirement for the data intake and query system to index, including to persistently store, all data received by the data intake and query system from the first data source for the time period, in proximity to the first and second plurality of bars.

13. A method as recited in claim 1, wherein causing an indication of the storage related estimate to be output to a user comprises causing to be displayed to the user a bar graph that includes:
a first plurality of bars, lengths of which are representative of total amounts of data indexed or to be indexed by the data intake and query system for a respective plurality of time periods; and a second plurality of bars, lengths of which are representative of total amounts of data to be indexed by the data intake and query system if the data intake and query system were to index all data received from the first data source, for the respective plurality of time periods.

14. A method as recited in claim 1, wherein causing an indication of the storage related estimate to be output to a user comprises causing to be displayed to the user a bar graph that includes:
   a first plurality of bars, lengths of which are representative of total amounts of data indexed or to be indexed by the data intake and query system for a respective plurality of time periods; and
   a second plurality of bars, lengths of which are representative of total amounts of data to be indexed by the data intake and query system if the data intake and query system were to index all data received from the first data source, for the respective plurality of time periods; and
   wherein at least some of the first plurality of bars are overlaid on respective ones of the second plurality of bars, or vice versa.

15. A method as recited in claim 1, wherein causing an indication of the storage related estimate to be output to a user comprises causing to be displayed to the user a bar graph that includes:
   a first plurality of bars, lengths of which are representative of total amounts of data indexed or to be indexed by the data intake and query system for a respective plurality of time periods; and
   a second plurality of bars, lengths of which are representative of total amounts of data to be indexed by the data intake and query system if the data intake and query system were to index all data received from the first data source, for the respective plurality of time periods; and
   wherein causing an indication of the storage related estimate to be output to a user comprises causing an indication of a current license associated with the user to be displayed in proximity to the first and second plurality of bars.

16. A method as recited in claim 1, wherein causing an indication of the storage related estimate to be output to a user comprises causing to be displayed to the user a bar graph that includes:
   a first plurality of bars, lengths of which are representative of total amounts of data indexed or to be indexed by the data intake and query system for a respective plurality of time periods; and
   a second plurality of bars, lengths of which are representative of total amounts of data to be indexed by the data intake and query system if the data intake and query system were to index all data received from the first data source, for the respective plurality of time periods; and
   wherein causing an indication of the storage related estimate to be output to a user comprises causing an indication of a license requirement to be displayed in proximity to the first and second plurality of bars, the license requirement being a requirement for the data intake and query system to index, including to persistently store, all data received by the data intake and query system from the first data source for a time period.

17. A method as recited in claim 1, wherein each of the first plurality of events includes machine data.

18. A method as recited in claim 1, wherein each of the first plurality of events includes a timestamped machine data.

19. A method as recited in claim 1, further comprising:
   enabling the user to view event data in events that are included in said sample of the first plurality of events, while received data from the first data source has not been fully indexed.

20. A method as recited in claim 1, further comprising, while received data from the first data source has not been fully indexed:
   executing a user-specified search query on events included in said sample of the first plurality of events; and
   enabling the user to view a result of the user-specified search query.

21. A method as recited in claim 1, wherein each of the first plurality of events includes a timestamped machine data, the method further comprising:
   enabling the user to view raw machine data in events that are included in said sample of the first plurality of events while received data from the first data source has not been fully indexed.

22. A method as recited in claim 1, further comprising:
   causing a user input feature to be presented to the user to enable the user to specify that a status of the first data source should be changed from data source to be estimated to data source to be fully indexed; and
   in response to a user input directed to the user input feature, causing all data received from the first data source to be indexed by the data intake and query system.

23. A method as recited in claim 1, further comprising:
   generating a plurality of metrics for the first plurality of events;
   wherein the storage related estimate is generated based on at least one of the plurality of metrics.

24. A method as recited in claim 1, further comprising:
   generating a plurality of metrics for the first plurality of events;
   wherein the storage related estimate is generated based on at least one of the plurality of metrics, and wherein the plurality of metrics comprise at least one of: number of events in the first plurality of events, size of events in the first plurality of events, impact on processor utilization, impact on input/output utilization, impact on memory utilization, search performance, network performance or indexing performance.

25. A method as recited in claim 1, further comprising:
   storing the sample of the first plurality of events in a dedicated persistent storage container separate from fully indexed data, the dedicated persistent storage container being allocated only for data of estimated data sources.

26. A method as recited in claim 1, further comprising:
   causing to be displayed to the user, for each of a plurality of future time periods, an indication of an amount of storage space that would be required if the data intake and query system were to index all data received by the data intake and query system from the first data source and other data sources from which the data intake and query system receives data.

27. A method as recited in claim 1, wherein the sampling criterion comprises a sampling rate.

28. A method as recited in claim 1, wherein the sampling criterion comprises a prioritization based on an indexing workload associated with indexing data sources that are designated as to be indexed.

29. A system comprising:
a communication device through which to communicate on a computer network; and
at least one processor operatively coupled to the communication device and configured to perform operations including
receiving user inputs indicative that a first data source is to be a subject of a storage related estimate;
receiving data generated by the first data source;
parsing the data generated by the first data source into a first plurality of events;
generating the storage related estimate, based on at least some of the first plurality of events;
causing an indication of the storage related estimate to be output to a user; and
completing an indexing of only a sample of the received first plurality of events based on a sampling criterion, and not completing indexing of a remainder of the first plurality of events in the absence of a user input indicative that the first data source should be indexed, the sample being fewer than all of the first plurality of events, wherein completing indexing includes committing data being indexed or to be indexed to persistent storage.

30. A non-transitory machine-readable storage medium for use in a processing system of a data intake and query system, the non-transitory machine-readable storage medium storing instructions, an execution of which in the processing system causes the processing system to perform operations comprising:
receiving user inputs indicative that a first data source is to be a subject of a storage related estimate;
receiving raw data generated by the first data source;
parsing the raw data generated by the first data source into a first plurality of events;
generating the storage related estimate, based on at least some of the first plurality of events;
causing an indication of the storage related estimate to be output to a user; and
completing indexing of only a sample of the received first plurality of events based on a sampling criterion, and not completing indexing of a remainder of the first plurality of events in the absence of a user input indicative that the first data source should be indexed, the sample being fewer than all of the first plurality of events, wherein completing indexing includes committing data being indexed or to be indexed to persistent storage.

* * * * *